United States Patent [19]

Blount

[11] Patent Number: 5,703,258

[45] Date of Patent: Dec. 30, 1997

[54] SILICON AND PHOSPHORUS CONTAINING COMPOSITIONS

[76] Inventor: David H. Blount, 6728 Del Cerro Blvd., San Diego, Calif. 92120

[21] Appl. No.: 752,787

[22] Filed: Nov. 20, 1996

Related U.S. Application Data

[63] Continuation-in-part of Ser. No. 680,651, Jul. 16, 1996, which is a continuation-in-part of Ser. No. 160,176, Dec. 2, 1993, Pat. No. 5,563,285.

[51] Int. Cl.$^6$ ................... C07F 7/08; C07F 7/10
[52] U.S. Cl. .......... 556/404; 556/402; 556/405; 556/9; 556/12; 528/26; 528/26.5; 528/27; 528/28; 528/29; 554/77; 554/75; 548/402; 548/403; 548/405; 548/406; 549/483; 549/505; 540/486; 540/487
[58] Field of Search ................... 556/404, 402, 556/405, 9, 12; 528/26, 26.5, 27, 28, 29; 554/77, 75; 548/402, 403, 405, 406; 549/483, 505; 540/486, 487

[56] References Cited

U.S. PATENT DOCUMENTS

| | | | |
|---|---|---|---|
| 4,389,530 | 6/1983 | Arit et al. | 556/404 |
| 4,523,009 | 6/1985 | Neilson et al. | 556/404 X |
| 5,082,958 | 1/1992 | Wright et al. | 556/404 X |
| 5,563,285 | 10/1996 | Blount | 556/404 |

*Primary Examiner*—Paul F. Shaver

[57] ABSTRACT

A flame retardant organic silicon and phosphorus containing compound is produced by reacting a silicon halides compound with an organic phosphorus compound to produce an organic silicon and phosphorus halides compound which is then reacted with an organic compound to produce an organic silicon and phosphorus containing compound. This organic silicon and phosphorus containing compound is incorporated in an otherwise more flammable organic material under reaction conditions and in an amount sufficient to reduce the combustibility of the otherwise more flammable organic material. The organic silicon and phosphorus containing compound may also be utilized as coating agents, adhesives, surfactants, insecticides, hydraulic fluid and other uses.

23 Claims, No Drawings

SILICON AND PHOSPHORUS CONTAINING COMPOSITIONS

This application is a continuation in part of my U.S. patent application Ser. No. 08/680,651 filed Jul. 16, 1996, which is a continuation in part of U.S. patent application Ser. No. 160,176, filed Dec. 2, 1993, now U.S. Pat. No. 5,563,285.

This invention concerns novel compositions containing silicon and phosphorus atoms and their preparation and use. These compounds may contain a plurality of silicon atoms or a plurality of phosphorus atoms. These compounds may be utilized as flame retardants by incorporating these compounds within or coating a more flammable organic material, insecticides, hydraulic fluids, adhesives, coating agents, polymers, plastics and many other uses.

BACKGROUND

The production of silicone compounds and organic phosphorus compounds are well known in the Arts. The utilization of silicon halides to react with phosphorus containing compounds to produce novel silicon and phosphorus containing organic halide compounds which will react with organic compounds to produce novel organic silicon and phosphorus containing organic compounds is novel. The organic silicon and phosphorus containing compounds and polymers have novel and desirable properties which decrease flammability and smoke production when these products are burned or when products containing these compounds or polymers are burned. The silicon halides are highly active compounds and will readily react with inorganic and organic phosphorus containing compounds to produce silicon and phosphorus containing compounds. Silicon halides will readily react with organic trivalent phosphorus compounds such as dialkyl hydrogen phosphites, trialklyl phosphites and dialkyl alkyl phosphonates to produce organic silicon-phosphorus compounds wherein the silicon atom reacts with the phosphorus atom. The silicon halides reaction with organic phosphates is slower.

The object of this invention is to provide organic silicon and phosphorus halides compounds or polymers which are utilized to produce organic silicon and phosphorus containing compounds, polymers and products, and flame retardant organic compositions rendered less flammable. Another object is to produce compounds or polymers which may be used as flame retardants, to produce insulation foams, building components, insecticides, adhesives, coating agents, hydraulic fluids, surfactants, release agents and many other uses.

SUMMARY

In one respect, the invention comprises reacting silicon and phosphorus containing organic halides compounds and their reaction compounds or polymers with organic compounds. Another aspect of the invention is a process to prepare the silicon and phosphorus containing organic compounds and/or polymers comprising serially contacting A) a silicon halides with B) a phosphorus containing organic compound then with C) an organic compound under conditions sufficient to prepare the organic silicon and phosphorus containing organic compound and/or polymer. The sequence of the addition of components A, B and C may be varied depending on the end product desired. Basic compounds (Component D) may also be added with the organic compound to react with and remove the halides. Water (Component E) may also be utilized to react with the organic silicon and phosphorus containing halides compound and/or polymer. The first step is to react the silicon halides with a phosphorus containing organic compound such as an organic phosphate or phosphite to produce an organic silicon and phosphorus halides compound. The second step is to react the organic silicon and phosphorus halides with an organic compound such as oxiranes, alcohols and polyalcohols. Basic compounds may be utilized to react with the halides and water may be utilized to react with silicon halide moiety or utilized to wash the product produced. A catalytically effective amount of a catalyst such as Lewis acids, for example, titanium tetrachloride, aluminum trichloride, or aluminum tribromide, in the amount of 0.1 to 5 percent by weight, may be added to the reaction mixture specially when oxiranes are used. Suitable acid acceptors, such as pyridine and sodium carbonate, are preferably present when alcohols are utilized in the reaction.

COMPONENT A

Any suitable silicon halides compound may be utilized such as silicon tetrachloride, silicon tetrabromide, silicon tetrafluoride, silicon tetraiodide, silicon hydrogen trichloride, silicon hydrogen fluoride, silicon hydrogen tribromide, silicon trichloride, alkyl trichlorosilane, aryl trichlorosilane, aryl-alkyl trichloridesilane, etc. Silicon tetrachloride is the preferred silicon halides.

COMPONENT B

Any suitable organic phosphorus compound may be utilized in this invention such as, but not limited to, organic phosphites, phosphonates, phosphates, hydrogen phosphites, and hydrogen phosphates, organic polyphosphates, organic phosphate-phosphites, halogenated phosphate-phosphites and their acid halides and acids, as found in U.S. Pat. No. 4,755,547, and organic polyphosphoric acids. Organic phosphates with organic phosphites are the preferred organic phosphorus compound.

COMPONENT C

Any suitable organic compound that will react with an organic silicon and phosphorus halides compound may be utilized in this invention. Suitable organic compounds may be substituted, saturated or unsaturated or mixture thereof. Suitable compounds are organic and inorganic-organic compounds with one or more active hydrogen and/or halide and/or metal radicals. These compounds may be aliphatic, aromatic, aliphatic-aromatic, heterocyclic, inorganic-organic and mixtures thereof. Suitable organic compounds include, but not limited to, alcohols, polyalcohols, epoxides, poloyepoxides, epihalohydrins, carboxylic acids and anhydrides, polycarboxylic acid and anhydrides, isocyanates, polyisocyanates, thioalcohols, thiophenols, phenols, phenoplasts, aldehydes, halogenated alcohols and polyalcohols, halogenated carboxylic acids and anhydrides, sulphonic acid chlorides, organic esters, organic ethers, thioethers, halomethyl compounds, ketones, nitriles, sulphonic acids, amines, polyamines, polyesteramides, amino compounds, aminoplasts, alkyl magnesium chloride, dialkyl mercury, dialkyl zinc, dialkyl magnesium, alkali metal carboxylic acids and polycarboxylic acids, alkyloxy alkali metals, alkali metal cyanides, alkaline earth metals cyanides, calcium carbide, arylalkenes, organic polyenes, aminophenols, proteins, terpenes, oils, fats, amides, polyamides, imides, polyimides, carbohydrates, lignin, cellulose, amino acids, arylalkynes, halogenated alkenes, aminoalcohols, organic carbonates, Grignard reagents, etc., and mixtures thereof. Alcohols with epoxides are the preferred organic compounds.

Any suitable organic compound which is identified as "Z" in the formulae of the organic silicon and phosphorus containing compounds may containing the following radicals and mixtures thereof, and may be utilized in this invention: —SH, —CH$_2$Cl, —CH$_2$Br, —CH$_2$I, —CN, —NO$_2$, —COCl, —COBr, —SO$_2$Cl, —SO$_2$Br, —COOH, —OH, —S$_2$OH, —COO—, —SO$_2$, —COC—,

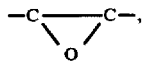

—NCO, —C=C—, —C≡C—, —NH$_2$, Zn=, —MgCl, =Hg,

COMPONENT D

Any suitable basic salt forming compound may be utilized in this invention. Suitable basic salt forming compounds include, but not limited to, compounds containing alkali metals, alkaline earth metals, metals and ammonium radicals, ammonia, amines, polyamines, amino compounds, aminoplasts and mixtures thereof. Basic salt forming compounds may be in the form of metals, oxides, hydroxides, carbonates, bicarbonates, salts of organic acids, silicates, natural minerals, sulfur, alkali polysulfides, etc. and mixtures thereof, in the amount of 0–50 parts by weight. The amino compounds are the preferred basic compound.

COMPONENT F

Water may be utilized to react with the organic silicon and phosphorus containing halides compound to produce silicon and phosphorus containing organic compounds and polymers. One or two mols of water added to each atom of a halide present on the organic silicon and phosphorus containing halides compound, but an excess of water may be used. Water may be used in the amount of 0–300 parts by weight.

DETAIL DESCRIPTION OF THE INVENTION

The components are mixed and reacted under conditions sufficient to prepare the organic silicon and phosphorus containing halide compounds and organic silicon and phosphorus containing compound and/or polymers. Ambient pressure is usually satisfactory except when a gas compound is utilized, then it may be necessary to compress the gas, preferably, until it forms a liquid or mixed with a liquid such as water, liquid alkanes, liquid aromatics, alkylene halides, etc. In many of the reactions it is necessary to cool the component mixture, in others it is necessary to use elevated temperatures. The preparation may be carded out under inert atmosphere such as argon and nitrogen. It may also be carried out in the presence of a diluent. Preferably inert, liquid diluents include the halogenated alkanes such as carbon tetrachloride, methylene chloride, chloroform and 1,2-dichloroethane.

Any suitable amount of silicon halides (Component A) may be mixed with organic phosphorus containing compounds (Component B) depending upon the type of compound desired. The amount of silicon halides may range from 10 to 100 parts by weight whereas the amount of organic phosphorus containing compound may range from 10 to 100 parts by weight. Any suitable amount of an organic compound (Component C) that will react with the organic silicon and phosphorus containing halides compound may be utilized. The amount of the organic compound may range from 10 to 100 parts by weight. An organic compound may be reacted with part of the halide atoms then another organic compound or inorganic compound is reacted with the remaining halide atoms. A basic salt forming compound (Component D) in the amount of 0 to 50 parts by weight may be utilized to react with the halides or with the organic silicon and phosphorus containing compound and/or polymer or utilized as a catalyst. Water (Component E) may be utilized in the range of 0 to 300 parts by weight and an excess amount may be used.

Any amount of the organic silicon and phosphorus halides or organic silicon and phosphorus containing compounds or polymer which is flame retardant is suitable for this invention. Preferably utilized in amount from one percent to 50 percent by weight of the otherwise more flammable organic material such as polyurethanes, polyester resins, epoxy resins, plastics, rubber, cellulose, wood, fabrics and other flammable materials. The average limiting oxygen index (LOI) is raised 10 percent or more when the organic silicon and phosphorus containing compound is incorporated in polyurethane foams.

The reaction of an organic phosphorus compound, containing a phosphate moiety, with a silicon halides compound probably does not produce a Si—P bond but the Si reacts with the double bonded oxygen of the phosphate moiety which is then reacted with an organic compound, which can be represented by the formula:

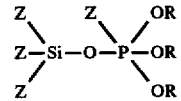

wherein Z is a halide selected from a chloro, fluoro, bromo or an organic radical with 1–20 carbons and R is a hydrogen or an organic radical with 1–20 carbons.

The reaction of an organic phosphorus compound, containing a phosphite moiety, with a silicon halides compound produces a Si—P bond which is then reacted with an organic compound which can be represented by the formula:

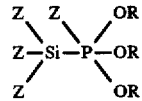

wherein Z is a halide selected from a chloro, fluor and bromo or an organic radical with 1–20 carbons and R is an organic radical with 1–20 carbons or hydrogen.

The exact formula for all of the compounds, polymers and products in this invention are not known but there is a mixture of compounds produced when the silicon halides are mixed and reacted with the organic phosphorus containing compounds. Phosphorus may have several valences such as 3, 4, 5 and 6. The usual valences are 3 or 5. When only three valences (phosphite moiety) are used the P may react with 2 other radicals. The organic silicon and phosphorus containing compounds of this invention may contain both phosphite and phosphate moieties. The phosphite moiety can be represented by the formula:

$$-O-P-O-$$
$$|$$
$$O-$$

The phosphate moiety can be represented by the formula:

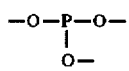

When one mol of silicon tetrahalide is mixed and reacted with one mol of an organic phosphorus containing compound wherein the phosphorus atom has reacted with three other atoms (phosphite moiety) such as trialkyl phosphites, triaryl phosphites, dialkyl hydrogen phosphites, diaryl hydrogen phosphites, dialkyl alkyl phosphonates, diaryl alkyl phosphonates, etc., the silicon atom reacts with the phosphorus atom to give a Si—P bond. These compounds have the general formula of:

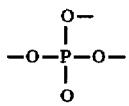

wherein X is a halide and R is an organic radical such as an alkyl, aryl, aryl-alkyl radicals with 1-20 carbons or a hydrogen when an acid phosphite is used. These compounds are usually a solid compound.

When two mols of silicon tetrahalide reacts with an organic phosphorus containing compound which has a phosphite moiety the product produced has the general formula of:

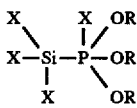

wherein X is a halide and R is an organic radical with 1-20 carbons or hydrogen.

When one mol of silicon tetrahalide reacts with two mols of an organic phosphorus compound with a phosphite moiety the product produced has the general formula

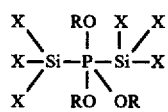

wherein X is a halide and R is an organic radical with 1-20 carbons or hydrogen.

When one mol of silicon tetrahalide reacts with one mol of an organic phosphorus compound with a phosphonate moiety the product produced has a general formula

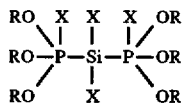

wherein X is a halide and R is an organic radical with 1-20 carbons or hydrogen and R' is an organic radical with 1-20 carbons.

When one mol of silicon tetrahalide is reacted with two mol of an organic phosphate compound or an organic hydrogen phosphate compound the product produced has a general formula

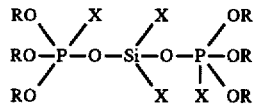

wherein X is a halide and R is an organic radical with 1-20 carbons or hydrogen.

When one mol of silicon tetrahalide reacts with one mol of an organic phosphate compound or an organic hydrogen phosphate compound the product produced has a general formula

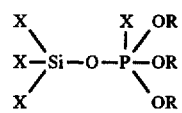

wherein X is a halide and R is an organic radical with 1-20 carbons or hydrogen.

When two mols of silicon tetrahalide reacts with one mol of organic phosphate compound or an organic hydrogen phosphate compound the product produced has a general formula

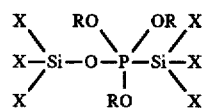

wherein X is a halide and R is an organic radical with 1-20 carbons or hydrogen.

When one mol of silicon tetrahalide reacts with one mol of an organic phosphorus containing compound with a phosphite moiety then the product is reacted with an excess amount of an organic compound the product produced has a general formula

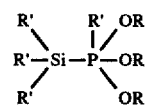

wherein R' is an organic radicals with 1-20 carbons and R is an organic radicals with 1-20 carbons or hydrogen.

When one mol of silicon tetrahalide is reacted with two mols of an organic phosphorus containing compound with a phosphite moiety then the product is reacted with an excess amount of an organic compound the product produced has the general formula

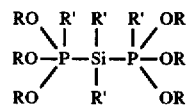

wherein R' is an organic radical with 1-20 carbons and R is organic radical with 1-20 carbons or hydrogen.

When two mols of silicon tetrahalide is reacted with one mol of an organic phosphorus containing compound with a phosphite moiety then the product is reacted with an excess amount of an organic compound the product produced has the general formula

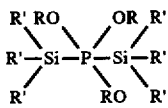

wherein R' is an organic radical with 1–20 carbons and R is an organic radical with 1–20 carbons or hydrogen.

When one mol of silicon tetrahalide is reacted with one mol of an organic phosphonate compound then the product is reacted with an excess amount of an organic compound the product produced has the general formula

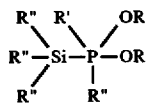

wherein R" and R' are organic radicals with 1–20 carbons and R is an organic radical with 1–20 carbons or hydrogen.

When one mol of silicon tetrahalide is reacted with two mols of an organic phosphonate compound then the product is reacted with an excess amount of an organic compound the product produced has the general formula

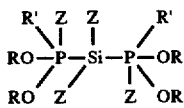

wherein Z is and organic radical with 1–20 carbons or a halide, R' is an organic radicals with 1–20 carbons and R is an organic radical with 1–20 carbons or hydrogen.

When two mols of silicon tetrahalide are reacted with one mol of an organic phosphonate compound then the product is reacted with an excess amount of an organic compound the product produced has the general formula

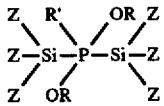

wherein Z is an organic radical with 1–20 carbons or a halide, R' and R are organic radicals with 1–20 carbons.

When one mol of silicon tetrahalide is reacted with one mol of an organic phosphate compound then the product is reacted with an excess amount of an organic compound the product produced has the general formula

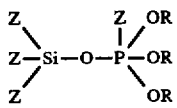

wherein Z is an organic radical with 1–20 carbon or a halide, and R is an organic radical with 1–20 carbons or hydrogen.

When two mols of silicon tetrahalide are reacted with one mol of an organic phosphate compound then the product is reacted with an excess amount of an organic compound the product produced has the general formula

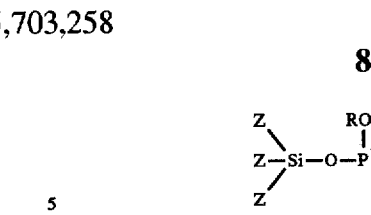

wherein Z is an organic radical with 1–20 carbons or a halide, and R is an organic radical with 1–20 carbons or hydrogen.

When one mols of silicon tetrahalide is reacted with two mols of an organic phosphate compound then the product is reacted with an excess amount of an organic compound the product produced has the general formula

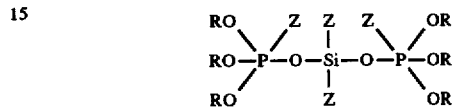

wherein Z is an organic radical with 1–20 carbons or a halide, and R is an organic radical with 1–20 carbons or hydrogen.

When one mol of silicon tetrahalide is reacted with one mol of an organic phosphite compound then the product is reacted with an excess of water the product produced has the general formula

wherein R is an organic radical or Hydrogen.

When one mole of a silicon tetrahalide is reacted with one mole of an organic phosphite and one mol of an organic phosphate compound the compound produced has the general formula

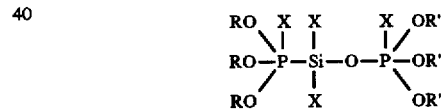

wherein R is an organic radical with 1–20 carbons, R' is an organic radical with 1–20 carbons or hydrogen and X is a halide selected from the group consisting of halogen, fluorine or bromide. This organic silicon and phosphorus tetrahalide contains both the phosphite moiety and the phosphate moiety.

DESCRIPTION OF PREFERRED EMBODIMENTS

The following examples which describe certain preferred embodiments of the processes may, of course, be varied as described above with similar results. Parts and Percentages are by weight unless otherwise indicated.

EXAMPLE 1

170 parts by weight of silicon tetrachloride and 160 parts by weight of triethyl phosphite are slowly added to a beaker in cool water while agitating. The mixture rapidly reacts to produce a solid organic silicon and phosphorus containing halide compound which has the general formula

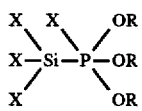

wherein R is an organic radical with 1–20 carbons or hydrogen, and X is a halide.

EXAMPLE 2

Example 1 is modified wherein another silicon halides compound is used in place of silicon tetrachloride and selected from the list below:
a) silicon tetrabromide
b) silicon tetrafluoride (under pressure)
c) silicon hydrogen trichloride
d) methyl silicon trichloride
e) silicon tribromide
f) silicon bromotrichloride
g) silicon tetraiodide
h) ethyl silicon trichloride
i) phenyl silicon trichloride
j) and mixtures there of

EXAMPLE 3

Example 1 is modified wherein another organic phosphite is used in place of triethyl phosphite and selected from the list below:
a) trimethyl phosphite
b) dimethyl hydrogen phosphite
c) diethyl hydrogen phosphite
d) triisopropyl phosphite
e) tributyl phosphite
f) triisooctyl phosphite
g) tris(2-chloroethyl) phosphite
h) tris(2-ethylhexyl) phosphite
I) dimethyl hydrogen phosphite
j) diethyl hydrogen phosphite
k) diisopropyl hydrogen phosphite
l) dibutyl hydrogen phosphite
m) bis(2-ethylhexyl) hydrogen phosphite
n) dilauryl hydrogen phosphite
o) bis(tridecyl) hydrogen phosphite
p) dioleyl hydrogen phosphite
q) and mixture thereof

EXAMPLE 4

170 parts by weight of silicon tetrachloride and 280 parts by weight of trimethyl phosphate are added to a beaker in cool water while agitating. The mixture slowly react over a period of 2–6 hours but if temperature rises it reacts rapidly to produce a solid organic silicon and phosphorus tetrahalide compound which has the general formula of:

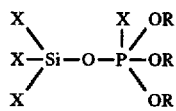

wherein R is an organic radical with 1–20 carbons or hydrogen, and X is a halide.

EXAMPLE 5

Example 4 is modified wherein another silicon halides is used in place of silicon tetrachloride and selected from the list below:
a) silicon tetrabromide
b) silicon tetrafluoride (under pressure)
c) silicon hydrogen trichloride
d) silicon trichloride
e) silicon tribromide
f) silicon triiodide
g) methyl silicon trichloride
h) ethyl silicon trichloride
i) phenyl silicon trichloride
j) and mixture thereof.

EXAMPLE 6

Example 4 is modified wherein another organic phosphate is used in place of trimethyl phosphate and selected from the list below:
a) triethyl phosphate
b) triethyl phosphate
c) triisopropyl phosphate
d) tributyl phosphate
e) tributoethyl phosphate
f) tris(2-ethylhexyl) phosphate
g) dibutyl hydrogen phosphate
h) diphenyl hydrogen phosphate
i) diisooctyl hydrogen phosphate
j) di(2-ethylhexyl) hydrogen phosphate
k) octophenyl hydrogen phosphate
l) and mixtures thereof.

EXAMPLE 7

170 parts by weight of silicon tetrachloride and 320 parts by weight of trimethyl phosphite are slowly added to a beaker in ice water while agitating. The mixture rapidly reacts to produce a solid organic silicon and phosphorus halides compound with the general formula of:

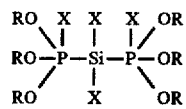

wherein R is an organic radical with 1–20 carbons or hydrogen and X is a halide selected from the group consisting of chloro, bromo and fluoro.

EXAMPLE 8

Example 7 is modified wherein another organic phosphite is used in place of trimethyl phosphite and selected from the list below:
a) triethyl phosphite
b) triisopropyl phosphite
c) dimethyl hydrogen phosphite
d) bis(2-ethylhexyl) hydrogen phosphite
e) tributyl phosphite
f) dibutyl hydrogen phosphite g) tributylethyl phosphite h) and mixtures thereof.

EXAMPLE 9

Example 7 is modified wherein another silicon halides compound is used in place of silicon tetrachloride and selected from the list below:

a) silicon tetrabromide b) silicon tetrafluoride (under pressure)

c) silicon hydrogen chloride d) methyl silicon trichloride e) ethyl silicon trichloride f) and mixtures thereof.

EXAMPLE 10

170 parts by weight of silicon tetrachloride and 150 parts by weight of dimethyl methyl phosphonate are slowly added to a beaker in cool water while agitating. The mixture react rapidly to produce a solid organic silicon and phosphorus halides compound with the general formula

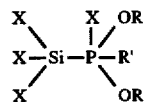

wherein R and R' is an organic radical with 1–20 carbons and X is a halide.

EXAMPLE 11

Example 10 is modified wherein another silicon halides is used in place of silicon tetrahalide and selected from the list below:

a) silicon tetrabromide
b) silicon tetrafluoride (under pressure)
c) silicon hydrogen trichloride
d) methyl silicon trichloride
e) ethyl silicon trichloride
f) and mixtures thereof

EXAMPLE 12

Example 10 is modified wherein another organic phosphonate is used in place of dimethyl methyl phosphonate and selected from the list below:

a) diethyl ethyl phosphonate b) dibutyl butyl phosphonate c) bis(2-ethylhexyl) 2-ethylhexyl phosphonate d) bis(2-chloroethyl) 2-chloroethyl phosphonate e) mixtures thereof.

EXAMPLE 13

170 parts by weight of silicon tetrachloride and 160 parts by weight of triethyl phosphite are slowly added to a beaker in cool water while agitating. The mixture rapidly reacts to for a solid organic silicon and phosphorus tetrachloride compound then 300 parts by weight of methylene chloride is added while agitating then to this mixture 300 parts by weight of methyl magnesium chloride while agitating. The components react in 2–8 hours. The product layer is separated and filtered. The methylene chloride is removed by distillation thereby producing an organic silicon and phosphorus containing compound with the general formula

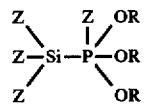

wherein Z is an organic radical with 1–20 carbons or a halide and R is an organic radical or hydrogen.

EXAMPLE 14

Example 13 is modified wherein another organo-metallic compound is used in place of methyl magnesium chloride and selected from the list below:

a) ethyl magnesium chloride
b) diethyl zinc
c) propyl magnesium chloride
d) phenyl magnesium chloride
e) dimethyl magnesium
f) diethyl mercury
g) potassium acrylate
h) sodium methyl acrylate
i) tin octate
j) butyllithium
k) ethyllithium
l) calcium carbide
m) methylzinc chloride
n) ethylzinc chloride
o) calcium cyanide
p) ethylaluminum
q) isobutylaluminum
r) butyleneborane
s) ethylsodium
t) tetraethyl lead
u) dibutyltin oxide
v) pheny magnesium chloride
w) sodium salt of phenol
x) and mixtures thereof.

EXAMPLE 15

Example 1 is modified wherein the solid organic silicon and phosphorus tetrahalides is added to 300 parts by weight of methylene chloride and them 140 parts by weight of methanol is slowly added while agitating. The mixture reacts for 2–8 hours, hydrogen halide evolves from the mixture, thereby producing an organic silicon and phosphorus containing compound with the general formula

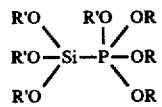

wherein R' is an organic radical with 1–20 carbons and R is an organic radical with 1–20 carbons or hydrogen. An aqueous solution of sodium carbonate is added to the organic silicon phosphorus containing compound while agitating to react with and remove any free hydrochloric acid. The aqueous solution is then filtered off.

EXAMPLE 16

Example 4 is modified wherein the organic silicon and phosphorus tetrahalides is added to methylene chloride then 300 parts by weight of methyl magnesium chloride is added while agitating for 2–8 hours. The product layer is separated and filtered off. The methylene chloride is removed by distillation thereby producing an organic silicon and phosphorus containing compound with the general formula

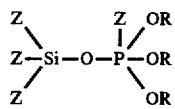

wherein Z is an organic radical with 1–20 carbons or a halide and R is an organic radical with 1–20 carbons or hydrogen.

EXAMPLE 17

Example 4 is modified wherein the organic silicon and phosphorus tetrahalide compound is added to an excess amount of methanol while agitating for 2–8 hours, hydrogen halide evolves from the mixture, then the excess methanol is removed by distillation thereby producing an organic silicon and phosphorus containing compound with the general formula

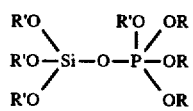

wherein R' is an organic radical with 1–20 carbons and R is an organic radical with 1–20 carbons or hydrogen.

Example 16 is modified wherein another organo-metallic compound is used in place of methyl magnesium chloride and selected from list below:

EXAMPLE 18 a) ethyl magnesium chloride
b) propyl magnesium chloride
c) dimethyl zinc
d) pheny magnesium chloride
e) dimethyl mercury
f) phenyl magnesium chloride
g) sodium propionate
h) tin octate
i) phenyl ethyl magnesium chloride
j) diethyl magnesium
k) dibutyltin oxide
l) tetraethyl lead
m) methylzinc chloride
n) butyllithium
o) potassium cyanide
p) ethyl aluminum
q) calcium carbide
r) ethylaluminum
s) ethylsodium
t) butyleneborane
u) and mixtures thereof.

EXAMPLE 19

Example 15 is modified wherein another organic compound is used in place of methyl alcohol and selected from the list below:

a) ethyl alcohol
b) ethylene glycol
c) propylene glycol
d) isopropyl alcohol
e) butanol
f) glycerol
g) dipropylene glycol -continued h) formaldehyde (under pressure)
i) aqueous formaldehyde
j) ethylene oxide (under pressure)
k) propylene oxide
l) butylene oxide
m) epichlorohydrin
n) epibromohydrin
o) acrylonitrile
p) chlorohydrin
q) acetonitrile
r) sodium acetate
s) acetic acid
t) fumaric acid
u) caster oil
v) adipic acid
w) acrylic acid
x) allyl alcohol
y) phenol
z) and mixture thereof

EXAMPLE 20

Example 17 is modifies wherein another organic compound is used in place of methanol and selected from the list below:

a) ethanol
b) triethylene glycol
c) ethylamine
d) aniline
e) propylene oxide
f) acrolein
g) acetylene (under pressure)
h) polyvinyl alcohol
i) triethylenediamine
j) N-vinyl-2-pyrrolidone
k) isobutyl vinyl ether
l) aminobenzoic acid
m) potassium octatate
o) succinic anhydride
p) sulfamic acid
q) benzaldehyde
r) tolylene diisocyanate
s) furfural
t) 3-methyl furan
u) methyl acrylic acid
v) epoxy-3-phenylpropane
w) 1,2-epoxybutane
x) polyglycidyl ether of resorcinol
y) urea
z) and mixtures of the above.

EXAMPLE 21

Example 10 is modified wherein the solid organic silicon and phosphorus tetrahalide compound is added to 300 parts by weight of methylene chloride then 300 parts by weight of methyl magnesium chloride is slowly added while agitating for 2 to 8 hours. The product layer is separated and filtered. The solvent, methylene chloride, is removed by distillation thereby producing an organic silicon and phosphorus containing compound with the general formula

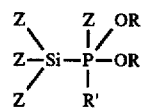

wherein Z is an organic radical with 1–20 carbons or a halide selected from chloro, fluoro and bromo, R' is an organic radicals and R is an organic radical or hydrogen.

EXAMPLE 22

Example 10 is modifies wherein the solid organic silicon phosphorus tetrahalide compound is slowly added to an excess amount of methanol while agitating for 2 to 8 hours until all the hydrogen halide has evolved thereby producing an organic silicon and phosphorus containing compound with the general formula

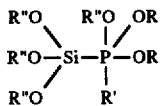

wherein R" and R' are organic radicals with 1–20 carbons and R is an organic radical with 1–20 carbons or hydrogen.

EXAMPLE 23

Example 10 is modified wherein the organic silicon phosphorus tetrahalide compound is added to methylene chloride then 350 parts by weight of phenyl magnesium chloride is slowly added while agitating for 2 to 8 hours. The product layer is separated and filtered. The solvent, methylene chloride, is removed by distillation thereby producing an organic silicon phosphorus containing compound with the general formula

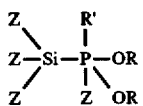

wherein Z is an organic radical with 1–20 carbons or a halide and R' are organic radicals with 1–20 carbons and R is an organic radical with 1–20 carbons or hydrogen.

EXAMPLE 24

Example 23 is modified wherein another organo-metallic compound is utilized in place of phenyl magnesium chloride and selected from the list below:

a) methyl magnesium chloride
b) ethyl magnesium chloride
c) diethyl zinc
d) dimethyl zinc
e) diethyl mercury
f) diethyl magnesium
g) propyl magnesium chloride
h) butyl magnesium chloride
i) phenyl ethyl magnesium chloride
j) butylene borane
k) dibutyltin oxide
l) ethylsodium
m) tin octate
n) sodium acetate
o) tetraethyl lead
p) methylzinc chloride
q) butyllithium
r) ethyllithium
s) isobutylaluminum
t) calcium carbide
u) sodium cyanide
v) and mixtures thereof.

EXAMPLE 25

Example 22 is modified wherein another organic compound is utilized in place of methanol and selected from the list below:

a) ethanol
b) butanol-1
c) 1,4-butandiol
d) triethylene glycol
e) polypropylene triol (OH No. 45)
f) ethylene oxide (under pressure)
g) 1,2- and trans-2,3-oxybiotin
h) propylene oxide
i) 1,2-epoxydecane
j) 1,2-epoxyoctadecane
k) allyl glycidyl ether
l) epifluorohydrin
m) epichlorohydrin
n) epibromohydrin
o) cis-7,8-epoxy-2 methylodadecane
p) 3,4-epoxy-1-butene
q) 1,2-epoxy-7-octene
r) 1,2-epoxy-cyclododecadiene
s) 1,2-epoxy-3-phenoxypropane
t) 2,3-epoxypropyl-4-methoxyphenyl ether
u) 2,4,6-tribomophenol glycidyl ether
v) ethylene glycol diglycideyl ether
w) benzyl alcohol
x) propagly alcohol
y) 2-chloroethanol
z) and mixture thereof.

EXAMPLE 26

Example 1 is modified wherein water is slowly added while agitating the organic silicon and phosphorus tetrahalide compound of example 1 thereby producing an organic silicate and phosphorus containing compound.

EXAMPLE 27

Example 4 is modified wherein water is slowly added while agitating the organic silicon and phosphorus tetrahalide compound of example 4 thereby producing an organic silicate and phosphorus containing compound.

EXAMPLE 28

Example 10 is modified wherein water is slowly added while agitating the organic silicon and phosphorus tetrahalide compound of example 10 thereby producing and organic silicate and phosphorus containing compound.

EXAMPLE 29

50 gms of silicon tetrachloride is slowly added to 50 gms of trimethyl phosphite while agitating in a cooled beaker thereby producing a solid organic silicon and phosphorus tetrachloride compound, then 200 gms of phenol is added while agitating, and then 200 gms of concentrated aqueous formaldehyde is added while agitating. Hydrogen chloride evolves from the mixture. The mixture slowly thicken then solidifies to produce a flame retardant phenoplast containing silicon and phosphorus polymer.

EXAMPLE 30

Example 29 is modified wherein another organic phosphorus containing compound is used in place of trimethyl phosphite and selected from the list below:

a) triethyl phosphite
b) dimethyl methyl phosphonate
c) dimethyl hydrogen phosphite
d) triethyl phosphate -continued e) trimethyl phosphate
f) diethyl hydrogen phosphate
g) dimethyl chlorophosphine
h) halogenated phosphate-phosphite
i) tris(2-chloropropyl) phosphate
j) tributyl phosphate
k) tributylethyl phosphate
l) triphenyl phosphite
m) diethyl hydrogen phosphite
n) diethyl ethyl phosphonate
o) phenyl polyphosphoric acid
p) and mixtures of the above.

EXAMPLE 31

50 gms of silicon tetrachloride and 50 gms of triethyl phosphite are slowly added to a cooled beaker while agitating. The mixture rapidly react to form a solid organic silicon and phosphorus tetrahalide then 150 gms of aqueous formaldehyde containing 150 gms of urea is slowly added to the mixture while agitating the mixture slowly thicken then solidify thereby producing a flame retardant aminoplast containing silicon and phosphorus.

EXAMPLE 32

Example 31 is modified wherein another amino compound is used in place of urea and selected from the list below:

a) melamine
b) thiourea
c) dicyandiamide
d) methyl urea
e) guanidine
f) aminoguanidine

EXAMPLE 33

50 gms of dimethyl methyl phosphonate and 50 gms of silicon tetrabromide are slowly added to a cooled beaker while agitating thereby producing a solid organic silicon and phosphorus tetrahalide then 200 gms of propylene glycol with 200 gms of phthalic anhydride are added while agitating for 2–8 hours until all the hydrogen bromide evolves from the mixture. The mixture is then heated to 90–250 degree C. for 1–2 hours thereby producing a solid flame retardant polyester resin containing silicon and phosphorus. A ⅛" thick piece of this flame retardant polyester resin was flame tested utilizing a ½" propane flame which was place ½" from the resin for 30 seconds and the flame did not spread.

EXAMPLE 34

Example 33 is modified wherein another mixture of polyalcohol and polycarboxyl acid and/or anhydrides are used in place of propylene glycol and phthalic anhydride and selected from the list below:

a) glycerol and phthalic acid
b) diethylene glycol and adipic acid
c) diethylene glycol and fumaric acid
d) ethylene glycol and maleic anhydride
f) dipropylene glycol and succinic acid
g) ethylene glycol and terephthalic acid

EXAMPLE 35

50 gms of trimethyl phosphate and 25 gms of silicon tetrabromide are added to a cooled beaker while agitating and they slowly react to produce a solid organic silicon and phosphorus tetrabromide compound, then 50 gms of glycerol and 150 gms of propylene oxide are mixed and then slowly added and reacted while agitating. Hydrogen bromide evolves from the mixture thereby producing a flame retardant polyol containing silicon and phosphorus.

EXAMPLE 36

Example 35 is modified wherein the flame retardant polyol produce in example 35 is mixed with 3 gms of a silicone surfactant (L5420 by Union Carbide), 1 gm of an amine catalyst (Polycat R 8020 by Air Products), 0.5 gms of a tin catalyst (T12 by Air Products) and 3 gms of water then the mixture is mixed with 100 gms of polymeric MDI (Mondur MR by Miles) thereby producing a flame retardant polyurethane foam. After the foam cured for one week the foam was flame tested by using a ½" propane flame. The flame was placed ½" from a ½" thick piece of the foam for 30 seconds, and the flame did not spread.

EXAMPLE 37

50 gms of silicon tetrachloride and 50 gms of triethyl phosphite are slowly added to a cooled beaker while agitating and the mixture rapidly reacts to produce a solid organic silicon and phosphorus tetrachloride compound. This compound is slowly added while agitating to a mixture of 50 gms of melted adipic acid in 70 gms of hexamethylene diamine. Hydrogen chloride evolves from the mixture. The mixture is then heated to above the melting point of adipic acid for 2–4 hours thereby producing a solid flame retardant polyamide resin containing silicon and phosphorus. A ⅛" thick piece of this resin was flame tested using a ½" propane flame which was placed ½" from the resin for 30 seconds, and the flame did not spread.

EXAMPLE 38

Example 37 is modified wherein another mixture of polyamine and polycarboxyl acid are utilized in place of adipic acid and hexamethylene diamine and selected from the list below:

a) sebacic acid and hexamethylene diamine
b) caprolactam
c) fumaric acid and diethylenetriamine
d) maleic acid and ethylenediamine

I claim:

1. An organic silicon and phosphorus containing composition for reducing combustibility of an otherwise more flammable organic material comprising incorporating an organic silicon and phosphorus containing compound, with the otherwise more flammable material, under reaction conditions and in an amount sufficient to reduce the combustibility of the otherwise more flammable organic material, said organic silicon and phosphorus containing compound produced by reacting the following components:

A) silicon halides with a

B) phosphorus containing organic compound thereby producing an organic silicon and phosphorus halides compound, then reacting with an C) organic compound that will react with a silicon halides compound thereby producing an organic silicon and phosphorus containing compound, then D) basic compound in the amount of 0–50 parts by weight is added, then E) water in the amount of 0–300 parts by weight.

2. An organic silicon and phosphorus containing compound of claim 1 wherein the silicon halides is reacted with an organic phosphorus containing compound which contains a phosphite moiety to produce an organic silicon and phosphorus halides compound, then reacted with component C thereby producing an organic silicon and phosphorus containing compound, said organic silicon and phosphorus containing compound corresponding to the general formula

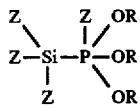

wherein Z is a halide selected from the group consisting of fluor, chloro and bromo or an organic radical containing 1–20 carbons and R is an organic radical containing 1–20 carbons or hydrogen.

3. An organic silicon and phosphorus containing compound of claim 1 wherein the silicon halides is reacted with an organic phosphorus containing compound which contains a phosphate moiety to produce an organic silicon and phosphorus halides compound, which is then reacted with component C to produce an organic silicon and phosphorus containing compound, said organic silicon and phosphorus containing compound corresponding to the general formula

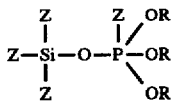

wherein Z is a halide selected from the group of fluor, chloro and bromo, or an organic radical containing 1–20 carbons, and R is an organic radical containing 1–20 carbons or hydrogen.

4. An organic silicon and phosphorus containing compound of claim 1 wherein the silicon halides is reacted with an organic phosphorus containing compound which contains a phosphonate moiety to produce an organic silicon and phosphorus halides compound which is then reacted with component C to produce an organic silicon and phosphorus containing compound, said organic silicon and phosphorus containing compound corresponding to the general formula

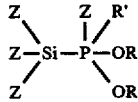

wherein Z is a halide selected from the group consisting of fluoro, chloro and bromo or an organic radical with 1–20 carbons, R' is an organic radical with 1–20 carbons and R is an organic radical with 1–20 carbons.

5. An organic silicon and phosphorus containing compound of claim 1 wherein component A is selected from the group consisting of silicon tetrachloride, silicon tetrabromide, silicon tetrafluoride, hydrogen silicon trichloride and alkyl silicon trichloride, in the amount of 10 to 100 parts by weight.

6. An organic silicon and phosphorus containing compound of claim 1 wherein component B is selected from the group consisting of trialkyl phosphites, triaryl phosphites, dialkyl hydrogen phosphites, diaryl hydrogen phosphites, dialkyl alkyl phosphonates, trialkyl phosphates, triaryl phosphates, organic acid phosphates, organic pyrophosphoric acids and mixtures thereof, in the amount of 10 to 100 parts by weight.

7. An organic silicon and phosphorus containing compound of claim 1 wherein component C is selected from the group consisting of substituted, saturated or unsaturated alcohols, polyalcohols, epoxides, polyepoxides, epihalohydrin, carboxylic acids and anhydrides, polycarboxylic acids and anhydrides, isocyanates, polyisocyanates, thioalcohols, phenols, phenoplasts, thiophenols, aldehydes, sulphonic acid chlorides, organic esters, organic ethers, polyethers, thioethers, ketones, nitriles, sulphonic acid, amines, polyamines, polyamides, alkenes, alkynes, arylalkenes, organic polyenes, polyesters, amino compounds, aminoplasts, aminoalcohol, aminophenols, carbohydrates, cellulose, lignin, terpenes, oils, fats, amides, alkyl carbonates, organo-metallic compounds, Grignard reagents and mixtures thereof.

8. An organic silicon and phosphorus containing compound of claim 1 wherein component A is silicon tetrachloride.

9. An organic silicon and phosphorus containing compound of claim 1 wherein component C is an organo-metallic compound or a Grignard reagent.

10. An organic silicon and phosphorus containing compound of claim 1 wherein component C is an polyalcohol and an epoxide thereby producing a flame retardant polyalcohol containing silicon and phosphorus compound.

11. An organic silicon and phosphorus containing compound of claim 1 wherein component C is polyalcohol and polycarboxylic acid and/or polycarboxylic anhydride thereby producing a flame retardant polyester resin containing silicon and phosphorus.

12. An organic silicon and phosphorus containing compound of claim 1 wherein component C is a polyamine and polycarboxylic acid thereby producing a flame retardant polyamide resin containing silicon and phosphorus.

13. An organic silicon and phosphorus containing compound of claim 1 wherein component C is a phenol compound and aqueous formaldehyde thereby producing a flame retardant phenol-formaldehyde resin containing silicon and phosphorus.

14. An organic silicon and phosphorus containing compound of claim 1 wherein component C is an amino compound and aqueous formaldehyde thereby producing a flame retardant aminoplast containing silicon and phosphorus.

15. The process for the production of flame retardant organic silicon and phosphorus containing compounds which consist of mixing and reacting the following components:
   A) silicon halides
   B) organic phosphorus containing compounds
   C) organic compound that will react with an organic silicon and phosphorus halides
   D) basic salt forming compound; in the amount of 0–50 parts by weight;
   E) water; in the amount of 0–300 parts by weight; components A and B are reacted to produce an organic silicon and phosphorus halides compound then component C is added and reacted thereby producing an organic silicon and phosphorus containing compound, then component D is added to react with halides or as a catalyst, then water is added to react with the silicon halide radicals or to dissolve and wash out the salt formed.

16. The process of claim 15 wherein component A is selected from the group of silicon halides consisting of silicon tetrahalides, hydrogen silicon trihalide, alkyl trichlorosilane, aryl trichlorosilane and mixtures thereof.

17. The process of claim 15 wherein component B is selected from the group of organic phosphorus containing compounds consisting of organic phosphites, organic hydrogen phosphites, organic phosphates, organic hydrogen phosphates, organic phosphonates, organic phosphines, organic polyphosphoric acid and mixtures thereof.

18. The process of claim 15 wherein Component C is selected from the group of organic compounds consisting of saturated, unsaturated and/or substituted alcohols, polyalcohols, epoxides, polyepoxides, epihalohydrin, thioalcohols, carboxylic acids and anhydrides, polycarboxylic acids and anhydrides, isocyanates, polyisocyanates, phenols, phenoplasts, thiophenols, aminophenols, sulphonic acid chlorides, organic esters, polyesters, ethers, polyethers, ketones, nitriles, acrylonitrile, sulfonic acids, amines, polyamines, amides, polyamides, aminoalcohols, amino compounds, alkenes, alkynes, arylaklenes, organic polyenes, carbohydrates, cellulose, lignin, terpenes, oils, fats, imides, polyimides, alkyl carbonates, organo-metalic compounds, Grignard reagents aldehydes and mixtures thereof.

19. The process of claim 15 wherein component D is selected from the group of basic compounds consisting of compounds containing alkali metals, alkaline earth metals, and metals, ammonia, ammonia radical, metals, amines, polyamines, amino compounds, aminoplasts and mixtures thereof.

20. An organic silicon and phosphorus halides compound of claim 1 wherein component A, silicon tetrahalide, is reacted with component B, an organic phosphite, to produce an organic silicon and phosphorus tetrahalide, said organic silicon and phosphorus tetrahalide corresponding to the general formula

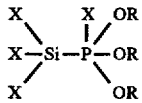

wherein X is a halide selected from the group consisting of chloro, fluoro and bromo, R is and organic radical with 1–20 carbons or hydrogen.

21. An organic silicon and phosphorus halides compound of claim 1 wherein component A, silicon tetrahalide, is reacted with component B, organic phosphonate, to produce an organic silicon and phosphorus tetrahalide, said organic silicon and phosphorus tetrahalide corresponding to the general formula

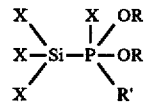

wherein X is a halide selected from the group consisting of chloro, fluoro and bromo, R' and R are organic radicals with 1–20 carbons.

22. An organic silicon and phosphorus halides compound of claim 1 wherein component A, silicon tetrahalide, is reacted with component B, organic phosphate, to produce an organic silicon and phosphorus tetrahalide compound, said organic silicon and phosphorus tetrahalide compound corresponding to the general formula

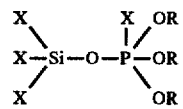

wherein X is a halide selected from the group consisting of chloro, fluoro and bromo, R is an organic radical with 1–20 carbons or hydrogen.

23. The product produced by the process of claim 15.

* * * * *